US011448057B2

(12) United States Patent
Samuel et al.

(10) Patent No.: US 11,448,057 B2
(45) Date of Patent: Sep. 20, 2022

(54) ADJUSTING WELL TOOL OPERATION TO MANIPULATE THE RATE-OF-PENETRATION (ROP) OF A DRILL BIT BASED ON MULTIPLE ROP PROJECTIONS

(71) Applicant: Landmark Graphics Corporation, Houston, TX (US)

(72) Inventors: Robello Samuel, Cypress, TX (US); Manish K. Mittal, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 763 days.

(21) Appl. No.: 16/345,368

(22) PCT Filed: Jul. 18, 2018

(86) PCT No.: PCT/US2018/042650
§ 371 (c)(1),
(2) Date: Apr. 26, 2019

(87) PCT Pub. No.: WO2020/018085
PCT Pub. Date: Jan. 23, 2020

(65) Prior Publication Data
US 2022/0003107 A1    Jan. 6, 2022

(51) Int. Cl.
*E21B 44/02*   (2006.01)
*G06N 20/20*   (2019.01)
*E21B 45/00*   (2006.01)

(52) U.S. Cl.
CPC .............. *E21B 44/02* (2013.01); *E21B 45/00* (2013.01); *G06N 20/20* (2019.01); *E21B 2200/22* (2020.05)

(58) Field of Classification Search
CPC ...... E21B 44/02; E21B 45/00; E21B 2200/22; G06N 20/20
See application file for complete search history.

(56) References Cited

U.S. PATENT DOCUMENTS 6,799,117 B1    9/2004 Proett et al.
2004/0256152 A1   12/2004 Dashevskiy et al.
(Continued)

FOREIGN PATENT DOCUMENTS

WO    2015168708    11/2015

OTHER PUBLICATIONS

CA Application No. CA3,098,352, Office Action, dated Dec. 9, 2021, 4 pages.
(Continued)

*Primary Examiner* — Tara Schimpf
(74) *Attorney, Agent, or Firm* — Kilpatrick Townsend & Stockton LLP

(57) ABSTRACT

Multiple projected rate of penetration (ROP) values can be determined for purposes of adjusting well tools and well characteristics. For example, surface data can be determined based on a surface sensor signal. Downhole data can be determined based on a downhole sensor signal. A first value indicating a first projected ROP of a drill bit can be determined by providing the surface data as input to a first machine-learning model. A second value indicating a second projected ROP of the drill bit can be determined by providing the downhole data as input to a second machine-learning model. A third value indicating a third projected ROP of the drill bit can be determined by providing the first value and the second value input to a third machine-learning model. An operating characteristic of a well tool can be adjusted based on the third value.

20 Claims, 6 Drawing Sheets

(56) References Cited

U.S. PATENT DOCUMENTS

| | | |
|---|---|---|
| 2007/0185696 A1 | 8/2007 | Moran et al. |
| 2008/0262810 A1 | 10/2008 | Moran et al. |
| 2010/0108384 A1 | 5/2010 | Byreddy et al. |
| 2014/0110167 A1 | 4/2014 | Goebel et al. |
| 2015/0081222 A1 | 3/2015 | Laing et al. |
| 2015/0227841 A1* | 8/2015 | Laing .................... E21B 49/003 706/46 |
| 2016/0222741 A1* | 8/2016 | Lovorn ................ G05B 13/048 |
| 2016/0273330 A1 | 9/2016 | Dashevsky et al. |
| 2018/0171775 A1* | 6/2018 | Santos .................... E21B 44/02 |

OTHER PUBLICATIONS

PCT/US2018/042650, "International Search Report and Written Opinion", dated Feb. 1, 2019, 10 pages.
GB App. No. GB2015981.0, "First Examination Report", dated Mar. 25, 2022, 1 page.

\* cited by examiner

ADJUSTING WELL TOOL OPERATION TO MANIPULATE THE RATE-OF-PENETRATION (ROP) OF A DRILL BIT BASED ON MULTIPLE ROP PROJECTIONS

TECHNICAL FIELD

The present disclosure relates generally to systems and methods for use in a well system environment. More specifically, but not by way of limitation, this disclosure relates to adjusting well tool operation to manipulate a rate of penetration (ROP) of a drill bit based on multiple ROP projections.

BACKGROUND

Rate of penetration (ROP) is the speed at which a drill bit breaks the rock in a subterranean formation to deepen a well. The ROP can be influenced directly or indirectly by a number of controllable drilling parameters, such as a revolutions-per-minute value of a drill bit, a weight-on-bit value, or mud weight. The ROP can also be influenced directly or indirectly by a number of uncontrollable wellbore characteristics related to the lithology of the subterranean formation, such as rock type and rock strength. Some well operators may attempt to project (e.g., predict) the ROP for a drill bit prior to commencing drilling operations. But these projections are often inaccurate, resulting in poor drilling performance, damage to the drill bit and drill string, damage to the wellbore, or other problems.

DETAILED DESCRIPTION

Figure 1:
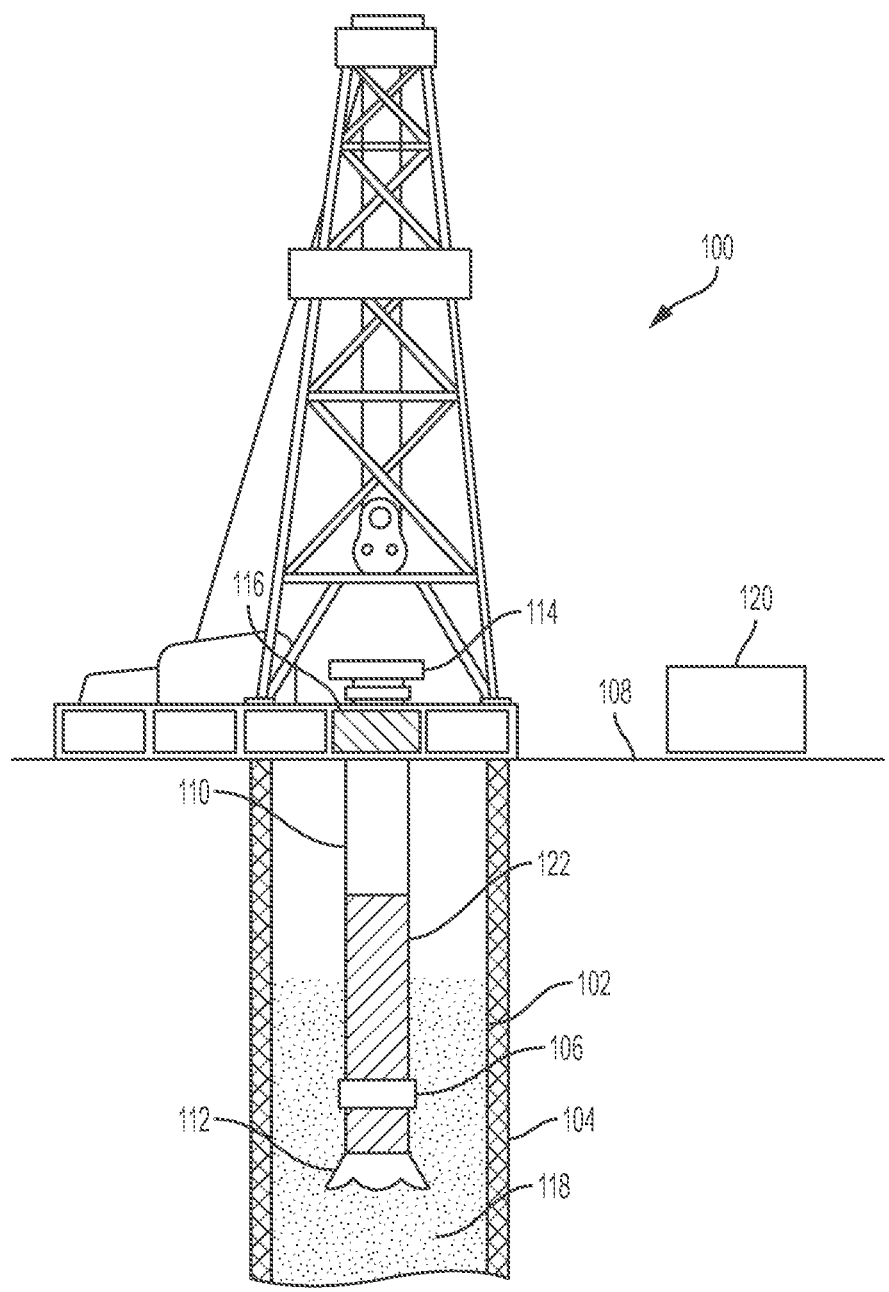
FIG. 1 is a schematic of an example of a well system that includes sensors and a computing device for adjusting well tool operation to manipulate a rate of penetration (ROP) of a drill bit based on multiple ROP projections according to some aspects of the present disclosure.

Certain aspects and features relate to adjusting well tool operation to manipulate a rate of penetration (ROP) of a drill bit based on a combination of ROP projections. The ROP projections can be determined for purposes of causing adjustments to well tool characteristics and settings. The ROP projections can be determined using data obtained from surface sensors located at the surface of the wellbore and downhole sensors located downhole within the wellbore. For example, one ROP projection can be determined using data from the surface sensors, and another ROP projection can be determined using data from the downhole sensors. The two ROP projections can then be used to determine a final, projected ROP value for the drill bit. This final, projected ROP value can be used in making adjustments to the well tools prior to and throughout the drilling phase. The adjustments made to the well tools can cause a change in the real-time ROP of the drill bit during the drilling phase of wellbore operations.

In some examples, the surface sensors and the downhole sensors can detect voltage signals or vibration measurements and transmit corresponding sensor signals to a computing device. For example, a surface sensor can detect a motor voltage used to rotate the drill string and drill bit and transmit a corresponding sensor signal to the computing device. As another example, the downhole sensor can detect downhole vibrations and transmit a corresponding sensor signal to the computing device. The computing device can receive and decompose the sensor signals into a number of sub-signals. The computing device can analyze the sub-signals to determine drilling parameters, such as a revolution-per-minute value of the drill bit, a weight-on-bit value, a mud weight, or any combination of these, among other factors related to the ROP of a drill bit. The computing device can determine different values for the drilling parameters based on the sensor signals from the surface sensors and the sensor signals from the downhole sensors. For example, the computing device can determine one set of drilling-parameter values based on the sensor signals from the surface sensor(s), and another set of drilling-parameter values based on the sensor signals from the downhole sensor(s). In some such examples, the computing device can determine one weight-on-bit value based on the sensor signals from the surface sensors, and another weight-on-bit value based on the sensor signals from the downhole sensors. But both values may be indicative of a true, real-time, weight-on-bit value.

In some examples, the computing device can use the values of the drilling parameters as inputs to one or more machine-learning models to obtain a projected ROP value. For example, the computing device can use one set of drilling-parameter values derived from the surface sensors as inputs to one machine-learning model, and another set of drilling-parameter values derived from the downhole sensors as inputs to another machine-learning model. Each machine-learning model can be implemented in parallel to determine separate, projected ROP values. The two projected ROP values can then be used as inputs to an additional machine-learning model to determine a final ROP projection, derived from both the surface data from the surface sensors and the downhole data from the downhole sensors. The final ROP projection can be used to adjust various well tool settings and wellbore characteristics to manipulate the actual ROP of the drill bit.

The ROP of a drill bit can be directly or indirectly correlated to a lithology of a subterranean formation and other wellbore characteristics. The lithology of a subterranean formation in which a wellbore is planned to be drilled or is being drilled can include various rock types having varying characteristics including rock strengths and porosity. As a wellbore is drilled, a drill bit can encounter varying rock types which can directly affect the ROP. For example, assuming well tool settings are left unadjusted, drilling through denser rock formations can result in a reduced ROP of the drill bit as compared to drilling through less dense rock formations. And drilling through less dense rock formations can result in an increased ROP of the drill bit as compared to drilling through denser rock formations. Further, less dense formations can result in more erratic and less consistent rates of penetration.

Controlling the drill bit's ROP while drilling of a subterranean formation can be an important part of drilling operations. Operational issues during drilling may arise when the lithology of a formation or estimated lithology of a formation is unknown or inaccurate and the ROP is not adjusted in response to the unknown conditions. For example, the ROP can increase when drilling through an unexpected rock formation with a lower-than-expected density. This undesired increase in ROP can cause operational issues including the drill bit overshooting a desired target depth. Similarly, when a drill bit encounters a rock formation that is stronger than expected or where the particular rock formation was omitted from the drilling plan, the drill bit or drill string may become damaged.

To prevent the abovementioned problems, various well tool settings and wellbore characteristics can be adjusted. For example, a revolution-per-minute value of the drill bit, a weight-on-bit value, and a mud weight within the wellbore can directly affect the ROP of the drill bit. Certain well tools can be adjusted to change these drilling parameters to maintain or adjust the real-time ROP of the drill bit to achieve a desired ROP. Adjusting a revolution-per-minute value of the drill bit, in addition to a bit type and bit size, can allow for sheering rock beneath the drill bit at varying rates. A weight-on-bit value, or the amount of pressure applied to the rock at the drill bit, can also be controlled to affect the ROP. Adjusting mud weight, or mud density, can be used to control and balance hydrostatic pressure in a wellbore to prevent unwanted fluid flow into the well. Excessive overbalance of mud weight can slow the drilling process by effectively strengthening the surrounding rock formations and limiting the removal of cut rock under the bit. Underbalance of mud weight can increase the ROP by reducing the pressure applied downhole. Mud weight can be adjusted within a safe threshold to alter the ROP throughout drilling.

While it can be important to adjust the ROP of the drill bit (e.g., in real time) in response to unexpected conditions within the wellbore, it can be useful to prevent any such issues from occurring in the first place and to reduce the amount of hindsight adjustments required. Some examples of the present disclosure can achieve these goals by projecting the likely ROP of a drill bit given existing downhole conditions, thereby enabling anticipatory adjustments to be made to well tool settings during a planning phase. The projected ROP of the drill bit can be based on both surface data and downhole data, resulting in a more-accurate projected ROP value than may otherwise be possible. After commencing drilling operations, some examples of the present disclosure can be used to adjust the real-time ROP of the drill bit by making well tool adjustments based on more accurately projected ROP values, so as to optimize the drilling operations. Adjusting the ROP of the drill bit in this manner can reduce the risk of error, increase safety, reduce the time spent on remedial actions, and/or prevent damage to well tools and the wellbore.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a schematic of a well system 100 that includes sensors 106, 116 and a computing device 120 for adjusting well tool operation to manipulate a ROP of a drill bit 112 based on multiple ROP projections according to one example. The well system 100 can include a wellbore 102 extending through various earth strata. The wellbore 102 extends through a hydrocarbon bearing subterranean formation 104.

The well system 100 includes a drill string 110 for drilling the wellbore 102 through the subterranean formation 104. The drill string 110 includes a wellbore drill assembly 122, which can be driven from a derrick 114 at the surface 108 of the wellbore 102. The wellbore drill assembly 122 includes a drill bit 112 operatively coupled to the drill string 110, which may be moved axially within a drilled wellbore 102 as attached to the drill string 110. Moving the drill string 110 axially downhole or uphole can affect a weight-on-bit value that can affect the ROP value of the drill bit 112 through the subterranean formation 104. The weight of the drill string 110 itself and other well system design characteristics can also affect the ROP value of the drill bit 112.

The drill string 110 may be coupled to a motor located at the surface 108. The motor can rotate the drill string 110 at varying revolution-per-minute values to drive the drill bit 112 through the subterranean formation 104. The revolution-per-minute values provided by the motor can be directly correlated to varying rates of penetration of the drill bit 112.

A sensor 116 can be coupled to the motor and positioned at the surface 108 of the wellbore 102. This sensor 116 can be referred to as a surface sensor. The sensor 116 can be a component of the motor or a separate component affixed to the motor to detect various parameters associated with the motor. In some examples, the sensor 116 can measure a voltage signal at the motor, where the voltage signal can correspond to various well-tool performance values and wellbore characteristics within the wellbore 102 at the drill bit 112. For example, a motor voltage measured by the sensor 116 can be inconsistent, such that the amplitude of the voltage signal spikes. Such amplitude spikes can indicate that the motor is requiring more power to maintain the same revolution-per-minute value. This may occur as a result of the drill bit 112 experiencing difficulty drilling through an unexpectedly dense portion of the subterranean formation 104. So, the amplitude spikes can be interpreted as indicating a decrease in the ROP of the drill bit 112 as a result of encountering denser material. In other examples, the sensor 116 can detect the actual revolution-per-minute value of the drill string 110.

A sensor 106 can be coupled to or installed in-line with the drill string 110. This sensor 106 can be referred to as a downhole sensor. In some examples, the sensor 106 can be a component of a drill bit assembly. In other examples, the sensor 106 can be a separate component coupled in-line with the drill bit 112 on the drill string 110 such that is located sufficiently close to the drill bit 112 to enable measurement of the drill bit 112 vibration. The sensor 106 can detect vibrations indicating various well-tool performance values and wellbore characteristics within the wellbore 102 proximate to the location of the drill bit 112. For example, vibrations measured by the sensor 106 can be different when drilling through a more dense formation as compared to a less dense formation. Drilling through a less dense material can result in a smoother drilling process resulting in less vibration exerted on the drill bit 112 detected by the sensor 106, whereas drilling through a denser material can result in a turbulent drilling process resulting in more vibration exerted on the drill bit 112 detected by the sensor 106. Certain characteristics of the vibrations can be interpreted to represent a decrease in the ROP of the drill bit 112 when encountering denser material, or an increase in the ROP of the drill bit 112 when encountering less dense material.

The wellbore 102 can include fluid 118. The fluid 118 can flow in an annulus positioned between the wellbore drill assembly 122 and a wall of the wellbore 102. In some examples, the fluid 118 can contact the sensor 106. This contact can allow the sensor 106 to measure conditions within the wellbore. Additionally, the sensor 106 may perform measurements related to the wellbore drill assembly 122. The sensor 106 can capture data about the wellbore environment in a logging while drilling ("LWD") or measurement while drilling ("MWD") configuration. For example, the sensor 106 can transmit sensed vibration signals or other sensed information to the computing device 120 to determine certain characteristics related to the mud rheology, such as flowrate and mud weight within the wellbore 102.

The sensors 106, 116 can be communicatively coupled to a computing device 120. The computing device 120 can be located at the surface 108 for receiving data from the sensors 106, 116. Data from the sensor 116 can be referred to as surface data. Data from sensor 106 can be referred to as downhole data. In some examples, the computing device 120 can decompose the surface and downhole data into sets of sub-signals corresponding to different well-tool performance values and wellbore characteristics within the wellbore 102. Based on the sets of sub-signals, the computing device 120 can determine one or more projected ROP values. The projected ROP value(s) can be used to adjust the operating characteristics of one or more well tools to manipulate the actual ROP of the drill bit 112. Such adjustments can include altering the revolution-per-minute value of the motor, changing the mud weight, controlling the weight-on-bit to exert more or less pressure downhole, or any combination of these.

In some examples, the computing device 120 can determine the projected ROP value(s) using two or more machine-learning models. The computing device 120 can store multiple sets of surface data and the downhole data previously obtained over a timespan (e.g., one month or one year) from the sensors 106, 116 for use as teaching data in order to teach (e.g., train) the machine-learning models how to determine the projected ROP values.

In some examples, drilling may be automated by the computing device 120 based on the projected ROP value(s), such that the various well tool settings may be adjusted based on outputs from the machine-learning models, a depth of the drill bit 112, or both of these. For example, the depth of the drill bit 112 can correspond to a certain lithology of the subterranean formation 104 according to a drilling plan, where rates of penetration can be optimized depending on the rock strength and type at each depth. For example, it may be desirable to drill through one type of rock using one ROP value as compared to drilling another type of rock. Based on a projected ROP value corresponding to various depths of a drilling plan, the computing device 120 can cause an adjustment to well tool settings to adjust the ROP from a first value for the first rock type to a second value for the second rock type (e.g., thereby optimizing the drilling operation). Seamlessly adjusting well tools settings at each rock transition layer can greatly improve drilling speed while reducing component failure. In some examples, the computing device 120 can be communicatively coupled to a control system, or can be a control system, for making adjustments to the well tool settings. Such a control system can automatically control motors, valves, pumping systems, and other well tools to affect the ROP in response to determining a projected ROP value or detecting a change in a projected ROP value according to a drilling plan. In some examples, the computing device 120 can output a message to a well operator to effectuate the desired well-tool setting adjustments for achieving a desired ROP value.

In some examples where drilling is not actively being performed, a wireline tool can be used to determine wellbore characteristics in the wellbore 102 and the surrounding subterranean formation 104 that are useful in determining a projected ROP value. The wireline tool can be lowered into and raised from the wellbore 102 using a reel and winch system arranged with the derrick 114. The wireline tool can be equipped with a downhole sensor for determining the wellbore characteristics. For example, a seismic tool can be lowered into the wellbore 102 to determine the surrounding rock types and depth of various rock type layers. This information can be relayed to the computing device 120 for determining or updating a projected ROP value.

Figure 2:
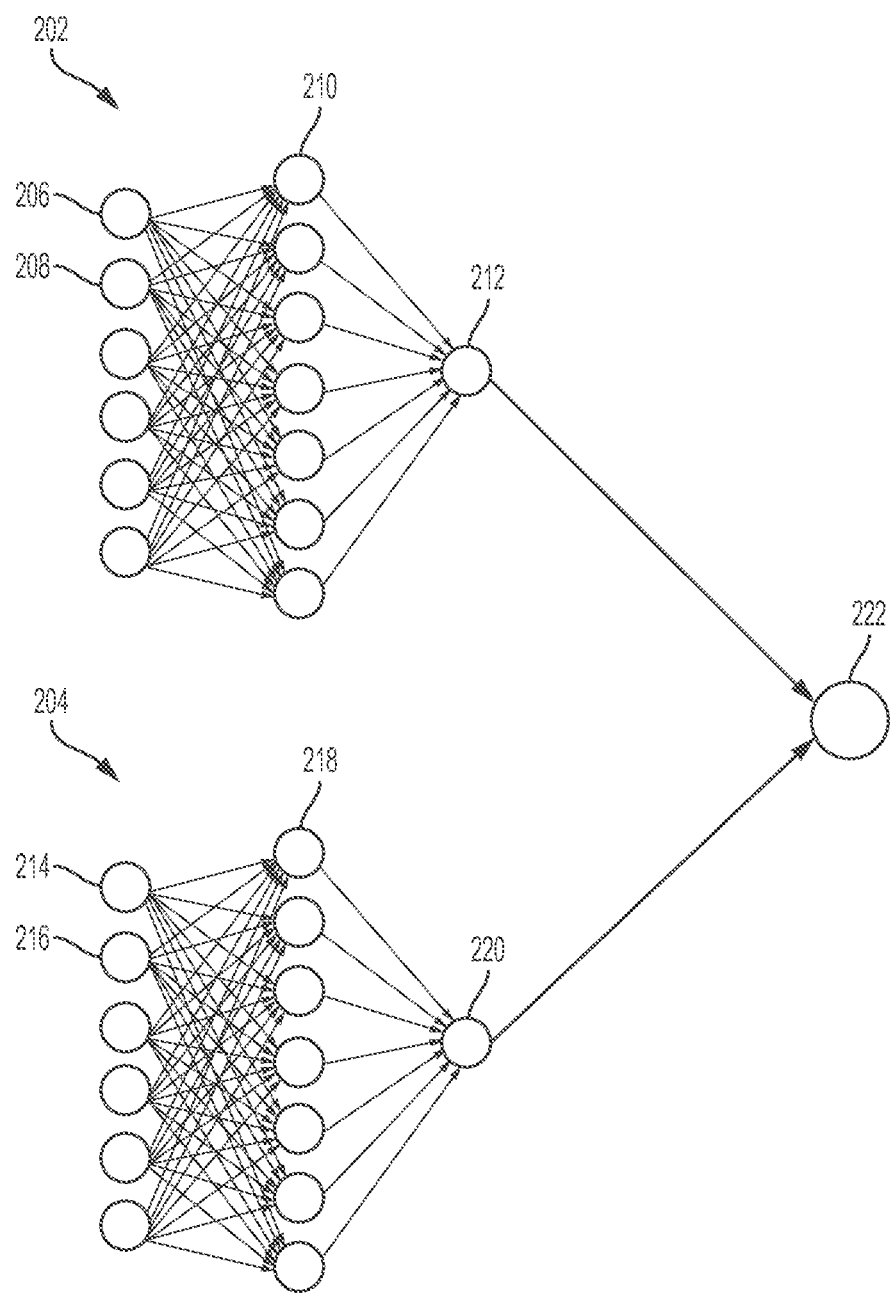
FIG. 2 is a node-link diagram of an example of one or more machine-learning models usable to determine ROP projections according to some aspects of the present disclosure.

FIG. 2 is a node-link diagram of one or more machine-learning models usable to determine ROP projections according to one example. A machine-learning model 202 and a machine-learning model 204 can be executed in parallel via the computing device 120. Each of the machine-learning models 202, 204 can determine a respective projected-ROP-value based on its respective inputs. Examples of the machine-learning models 202, 204 can include neural networks, decision trees, classifiers, or any combination of these.

The machine-learning model 202 can use surface data derived from the sensor 116 as input data to determine a projected ROP value corresponding to the surface data. The machine-learning model 202 can have N input nodes, such as input nodes 206, 208, for receiving the input data. The machine-learning model 202 can have one or more hidden nodes, such as hidden node 210, and an output node 212. The output of the output node 212 can be a projected ROP value based on the surface data.

The machine-learning model 204 can use downhole data derived from the sensor 106 as input data to determine a projected ROP value corresponding to the downhole data. The machine-learning model 204 can have N input nodes, such as input nodes 214, 216, for receiving the input data. The machine-learning model 204 can have one or more hidden nodes, such as hidden node 218, and an output node 220. The output of the output node 220 can be another projected ROP value based on the downhole data.

The input data to the machine-learning model 202 can include well tool parameters and wellbore characteristics derived from the sensor 116. For example, the input data can include revolution-per-minute data of the drill bit, a weight-on-bit value, mud weight, rock type, rock strength, wellbore fluid flowrate, three-dimensional acceleration data, abrasion of the drill bit, or any combination of these, among other types of data useful in determining a projected ROP value. Three-dimensional acceleration data can include acceleration values corresponding to unwanted shifts in the drill bit or drill string throughout the drilling process. Abrasion data can correspond to the amount of friction the drill bit is experiencing throughout drilling, which can be affected by the amount of wear on the drill bit. For example, a drill bit that should be replaced due to dulling or damage can result in ineffective drilling and therefore a reduced ROP.

The input data to the machine-learning model 204 can include well tool parameters and wellbore characteristics derived from the sensor 106. For example, the input data can include any of the types of data discussed above (e.g., but with different values obtained using the sensor 106).

The machine-learning models 202, 204 can be taught to determine correlations between various inputs and outputs. For example, the machine-learning model 202 can be taught using teaching data that includes thousands or millions of relationships between surface data and measured rates of penetration. The machine-learning model 204 can be separately taught using teaching data that includes thousands or millions of relationships between downhole data and measured rates of penetration. This teaching process can be done by iteratively supplying sets of surface data to the first machine-learning model and sets of downhole data to the second machine-learning model to obtain a multiple outputs indicating projected ROP values of the drill bit through the subterranean formation. The sets of surface data and sets of downhole data can be used as surface teaching data and downhole teaching data to define multiple relationships in one or more machine-learning models. The computing device can create multiple relationships between the sets of surface data, the sets of downhole data, and the multiple outputs, wherein the multiple relationships define each machine-learning model. In some examples, previously obtained surface data and downhole data can be used to teach each machine-learning model to produce more-accurate projected ROP values.

Using the surface teaching data and downhole teaching data as inputs to the machine-learning model 202 and the machine-learning model 204, respectively, can tune various weights (e.g., node weights) and biases based on the teaching data. The weights can increase or decrease the strength of an input at a nodal connection, such that more important inputs can be given more weight if they affect the ROP more than other inputs. This teaching process can be iterated until each machine-learning model is capable of determining a ROP value with an acceptable level of accuracy (e.g., 95% correct). Once a machine-learning model is sufficiently taught using the teaching data, the computing device can execute the machine-learning models to project new output data when new input data is available.

Because the values for the surface data and the downhole data can be different, the machine-learning models 202, 204 can each produce different projected ROP values. The machine-learning models 202, 204 can be executed in parallel to produce two projected ROP values simultaneously. Another node 222 can use the outputs from the output nodes 212, 220 as inputs and produce a final, projected ROP value based on the outputs from the output nodes 212, 220. Thus, this final, projected ROP value is determined using both the surface data and the downhole data.

In some examples, the node 222 can be an input node of an existing machine-learning model. In other examples, the node 222 can be an input node to an additional machine-learning model separate from the machine-learning models 202, 204. The additional machine-learning model can include corresponding hidden nodes and an output node similar to the machine-learning models 202, 204, where the output node outputs the final ROP value. The additional machine-learning model can be taught similarly to the machine-learning models 202, 204, such that the inputs are given certain weights and biases.

While the machine-learning model 202, machine-learning model 204, and node 222 are discussed above as being separate from one another, in other examples these may all collectively form a single machine-learning model. For example, the machine-learning models 202, 204 can both be portions (e.g., parallel portions) of a single machine-learning model and configured to automatically provide their outputs to the output node 212, which can also be a portion of the single machine-learning model. The machine-learning model 202, machine-learning model 204, and node 222 can be combined or reconfigured in any suitable manner.

Using multiple data inputs to determine, in parallel, two distinct ROP values that can then be used to determine a final, projected ROP value can increase the accuracy of the final projected ROP value. In some examples, the final projected ROP value can be determined at node 222, which can select one of the ROP values from output node 212 and output node 220. Alternatively, node 222 can average the ROP values from output node 212 and output node 220. As yet another example, node 222 can determine the final ROP value by attributing the ROP values from output node 212 and output node 220 with specific weights, such that one value can be given more weight than the other value. For example, if the projected ROP value from the machine-learning model 204 is determined to be more accurate than the projected ROP value from the machine-learning model 202, then the projected ROP value from the machine-learning model 204 can be given more weight when determining a final projected ROP value (e.g., the final projected ROP value can appear to be closer in value to the projected ROP value from the machine-learning model 204 than the projected ROP value from the machine-learning model 202).

While the above examples can involve the machine-learning models 202, 204 projecting outputs based on given inputs, other examples can involve projecting values for input parameters based on a given (e.g., desired) output. For example, the computing device can use thousands or millions of relationships between input data and output data to create a model through which a user can input a desired ROP value and obtain, as output values, well tool settings and wellbore characteristics to achieve the desired ROP value. This model can be referred to as a ROP model. For example, the computing device can receive an input corresponding to a ROP that is a higher value than a current ROP of a drill bit, such that the input ROP value is the optimized value as compared to the current value. The computing device can execute the ROP model to determine which input data should be altered to effectuate the desired ROP value in the current drilling process. Based on which input data is determined to be altered, the well tool settings and wellbore characteristics corresponding to that input data can be adjusted to realize the alteration of the input data, which in turn can cause the real-time ROP to be altered to be close to or equal to the desired ROP value.

In some examples, the ROP model can be generated at least in part by using the machine-learning models 202, 204. For example, thousands or millions of input data points can be iteratively supplied to the machine-learning models 202, 204 to obtain projected outputs. The computing device can form relationships between the input data points and the projected outputs to build the ROP model.

Processes described in some examples can be performed in real time to continuously determine and update a projected ROP value throughout the drilling process. This can help prevent drilling errors and avoid other problems. For example, by determining that a projected ROP value is different from a desired or expected ROP value, the computing device can use the ROP model to determine which of the inputs is likely causing the deviation. Once the source of the error is identified, the computing device can cause adjustments to operating characteristics of one or more well tools or wellbore characteristics to rectify the error for purposes of achieving the desired ROP. In some examples, by executing the machine-learning models 202, 204 in parallel, the computing device can minimize the amount of time it takes to determine a final projected ROP value, which can in turn be used to determine a source of and remedial action for an error.

Figure 3:
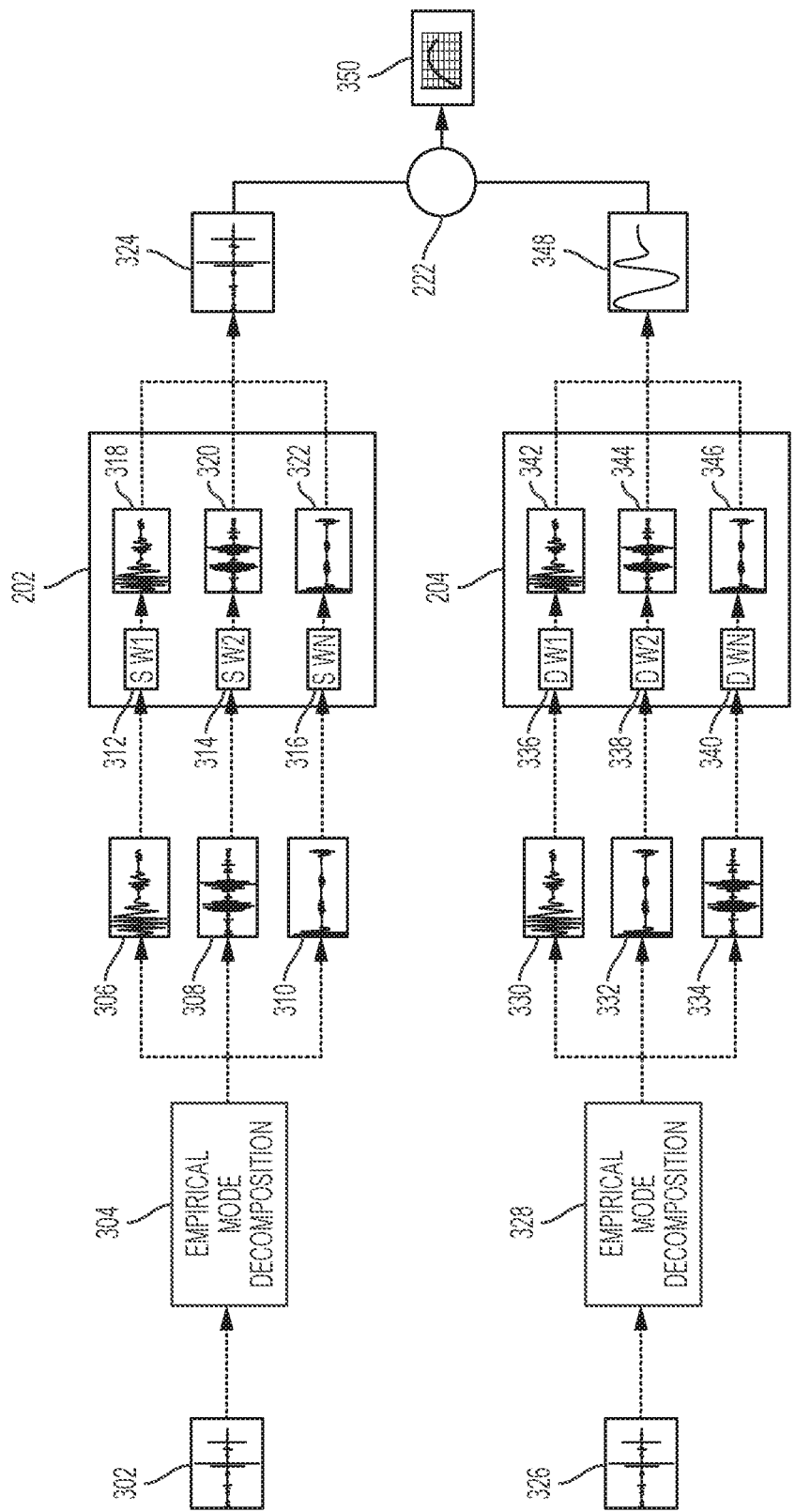
FIG. 3 is a flow diagram of an example of a process for determining ROP projections according to some aspects of the present disclosure.

FIG. 3 is a flow diagram of a process for determining ROP projections according to one example. Empirical mode decomposition can be used in conjunction with the parallel machine-learning processes described in FIG. 2 to determine a more-accurate projected ROP value.

The surface and downhole sensors can detect the surface data corresponding to one or more voltage signals (e.g., motor voltage) and downhole data corresponding to one or more vibration signals, then transmit the surface data and downhole data to the computing device. However, the voltage signals and vibration signals may be in a raw format such that drilling parameters associated with ROP values (e.g., revolution-per minute of drill bit, rock strength, flow rate, mud weight, weight-on-bit, etc.) may not be readily identifiable without manipulation of the voltage signals and vibration signals. In some examples, the raw format may be an analog format. The voltage signal corresponding to surface data may be one signal that includes indications of wellbore characteristics and well tool settings and performance as shown by amplitude spikes. The vibration signal corresponding to downhole data may be one signal that compounds vibrations resulting from wellbore characteristics, well tool settings, and performance. For example, certain magnitudes and frequencies of the raw vibration signal may be attributed to the abrasion of the drill bit, whereas other magnitudes and frequencies of the raw vibration signal may be the result of flow rate (e.g., viscosity of the wellbore fluid can dampen vibrations). As another example, a voltage signal corresponding to motor voltage can be sensitive to functional parameters of downhole production tools that are used for pumping fluids. Voltage signal interpretation and deconvolution can provide information about pump conditions.

Using empirical mode decomposition, the raw voltage and vibration signals from the surface and downhole sensors can be separated into their contributive parts. Raw voltage and vibration signals can be decomposed or deconvoluted to lower modes by eliminating noise until no more deconvolution can be performed. Raw signal 302 can represent a raw voltage signal detected by the surface sensor located at the surface of the wellbore. Decomposing the raw signal 302 via empirical mode decomposition at block 304 can result in isolation of signal contributions from various sources that affect ROP. The decomposition of raw signal 302 can result in N sub-signals, such as sub-signal A 306, a sub-signal B 308, and a sub-signal N 310, where the sub-signal N 310 can represent any number of additional sub-signals that are able to be decomposed from the raw signal 302. The sub-signals A 306, B 308, N 310 can correspond separately to drilling parameters such as revolution-per-minute of drill bit, rock strength, flow rate, mud weight, weight-on-bit that, where the drilling parameters are dependent on well tool settings and wellbore characteristics.

The machine-learning model 202 can accept the sub-signals A 306. B 308, N 310 as inputs. The machine-learning model 202 can assign various weights and biases to the sub-signals as described by some examples. A weight SW1 312 can be assigned to the sub-signal A 306, a weight SW2 314 can be assigned to the sub-signal B 308, and a weight SWN 316 can be assigned to the sub-signal N 310, where weight SWN 316 can represent any number of different additional weights for any number of the additional sub-signals. Assigning weights to the various sub-signals via the machine-learning model 202 can result in weighted sub-signal A 318, weighted sub-signal B 320, and weighted sub-signal N 322. Based on these weighted sub-signals, the machine-learning model 202 can determine and output a projected surface ROP value 324 derived from the raw signal 302.

A ROP value can be determined for the downhole data in parallel with the projected surface ROP value 324. Raw signal 326 can represent a raw voltage signal measured by the downhole sensor located downhole within wellbore. Decomposing the raw signal 326 via empirical mode decomposition block 328 can result in isolation of signal contributions from various sources that affect ROP. The decomposition of raw signal 326 can result in N sub-signals, such as a sub-signal A 330, a sub-signal B 332, and a sub-signal N 334, where the sub-signal N 334 can represent any number of additional sub-signals that are able to be decomposed from the raw signal 326. The sub-signals A 330, B 332, N 334 can correspond separately to drilling parameters such as revolution-per-minute of drill bit, rock strength, flow rate, mud weight, weight-on-bit that, where the parameters are dependent on well tool settings and wellbore characteristics.

The machine-learning model 204 can accept the sub-signals A 330. B 332, N 334 as inputs. The machine-learning model 204 can assign various weights and biases to the sub-signals as described by some examples. A weight D W1 336 can be assigned to the sub-signal A 330, a weight D W2 338 can be assigned to the sub-signal B 332, and a weight D WN 340 can be assigned to the sub-signal N 334, where weight D WN 340 can represent any number of different additional weights for any number of the additional sub-signals. Assigning weights to the various sub-signals via the machine-learning model 204 can result in weighted sub-signal A 342, weighted sub-signal B 344, and weighted sub-signal N 346. Based on these weighted sub-signals, the machine-learning model 204 can determine and output a projected downhole ROP value 348 derived from the raw signal 326.

The node 222 can accept the projected surface ROP value 324 and the projected downhole ROP value 348 as inputs as described in some examples. The output from the node 222, where the node may or may not be part of a separate machine-learning model, can be a more-accurate projected ROP value 350. Using empirical mode decomposition in conjunction with parallel machine-learning models can help identify errors in well tool operations or issues relating to wellbore characteristics. By identifying these issues more accurately and at a quicker rate, remedial options can be taken sooner to optimize the actual ROP of the drill bit throughout drilling operations.

In some examples, any of the signals, sub-signals, inputs, and outputs previously described in FIG. 3 can be in a digital format and/or the processes performed by empirical mode decomposition blocks 304, 328 may not be implemented. In such examples, digital signals can be used as inputs to the machine-learning models 202, 204 and node 222 to produce the projected surface ROP value 324, the projected downhole ROP value 348, and the projected ROP value 350 in digital formats. In some examples, a combination of digital signals and analog signals can be used as inputs to the machine-learning models 202, 204 and node 222.

Figure 4:
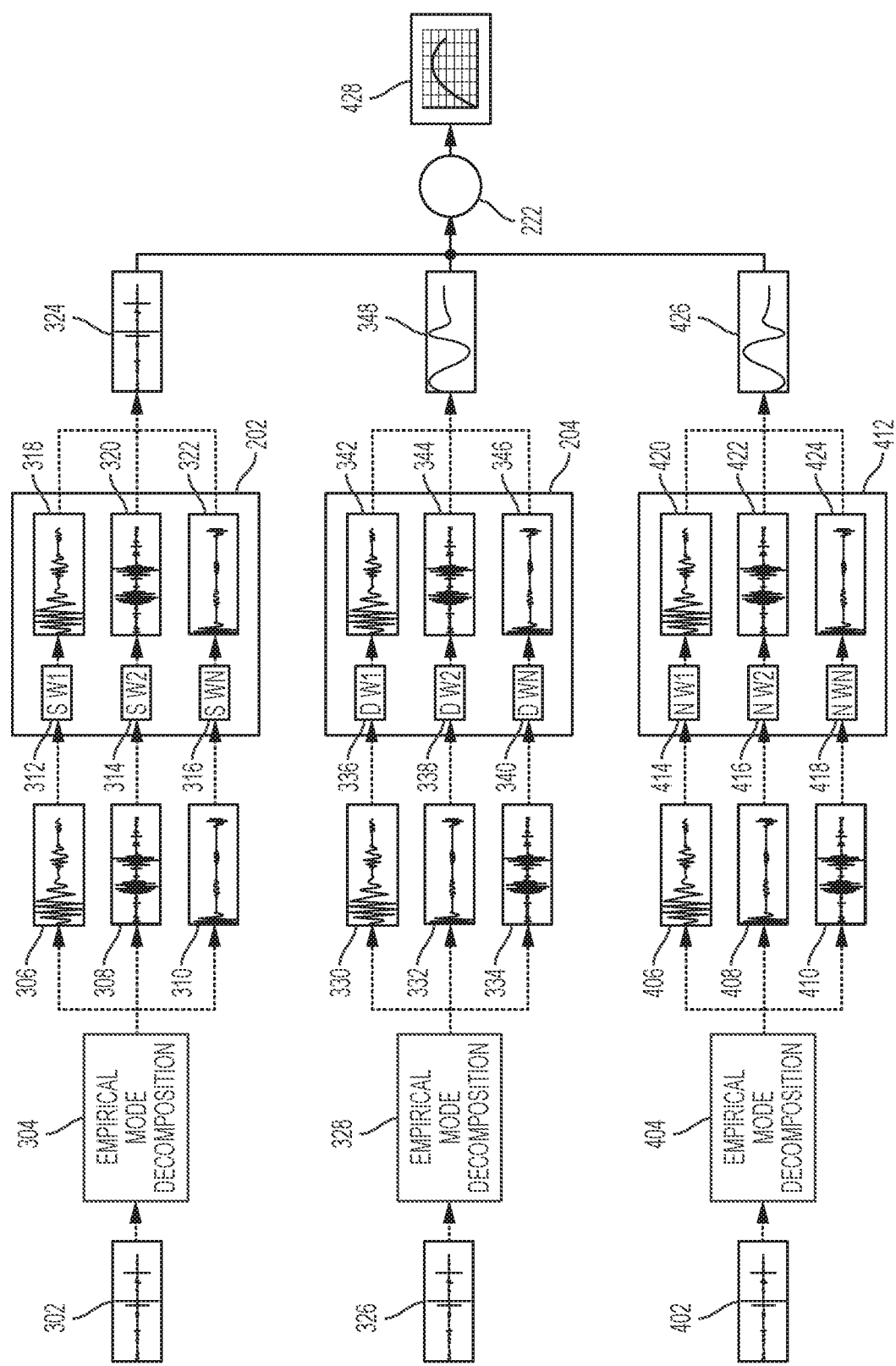
FIG. 4 is another flow diagram of an example of another process for ROP projections according to some aspects of the present disclosure.

FIG. 4 is another flow diagram of another process for ROP projections according to one example. Multiple machine-learning models can be built, taught, and/or used in parallel to determine a more-accurate projected ROP value. The example depicted in FIG. 4 includes the decomposition of raw signal 302 and raw signal 326 to obtain the projected surface ROP value 324 and the projected downhole ROP value 348 via the machine-learning model 202 and the machine-learning model 204 respectively as described in FIG. 3. Any number of additional raw signals sourced from other sensors or sources of well system data can be decomposed to produce any number of additional projected ROP values. Increasing the number of machine-learning models to determine additional projected ROP values can help produce a more accurate final ROP value.

For example, a sensor in addition to the previously discussed surface sensor and downhole sensor can measure a raw signal 402. The additional sensor may be located, for example, within the drill bit assembly as opposed to near the drill bit coupled to the drill string. In some examples, multiple sensors can be coupled in line with the drill string throughout the length of the drill string. It can be assumed that multiple iterations of the following example can be implemented in parallel with previously described signal decomposition examples. Decomposing the raw signal 402 via empirical mode decomposition block 404 can result in isolation of signal contributions from various sources that affect ROP. The decomposition of raw signal 402 can result in N sub-signals, such as a sub-signal A 406, a sub-signal B 408, and a sub-signal N 410, where the sub-signal N 410 can represent any number of additional sub-signals that are able to be decomposed from the raw signal 402. The sub-signals A 406, B 408, N 410 can correspond separately to drilling parameters such as revolution-per-minute of drill bit, rock strength, flow rate, mud weight, weight-on-bit that, where the parameters are dependent on well tool settings and wellbore characteristics.

The machine-learning model 412 can use the sub-signals A 330, B 332, N 334 as inputs. The machine-learning model 412 can assign various weights and biases to the sub-signals as described by some examples. A weight NW1 414 can be assigned to the sub-signal A 406, a weight NW2 416 can be assigned to the sub-signal B 408, and a weight NWN 418 can be assigned to the sub-signal N 410, where weight NWN 418 can represent any number of different additional weights for any number of the additional sub-signals. Assigning weights to the various sub-signals via the machine-learning model 412 can result in weighted sub-signal A 420, weighted sub-signal B 422, and weighted sub-signal N 424. Based on these weighted sub-signals, the machine-learning model 412 can determine and output another projected ROP value 426 derived from the raw signal 402.

The node 222 can use the projected additional ROP value 426 as input along with the projected surface ROP value 324 and the projected downhole ROP value 348. The output from the node 222, where the node may be part of a separate machine-learning model, can be a more accurately projected ROP value 428. As described in some examples, the projected ROP value 428 can be determined by selecting a most reliable and accurate output from the set of machine-learning model outputs, averaging the set of machine-learning model outputs, assigning weights to each output from the set of machine-learning model outputs, or any other appropriate method. As compared to the projected ROP value 350 determined in FIG. 3, the additional use of projected ROP value 426 can result in a more-accurate projected ROP value 428.

While the above example involves using outputs from three machine-learning models 202, 204, and 412 as inputs to node 222, other examples can involve using outputs from any number and combination of machine-learning models as input to node 222 in order to produce the projected ROP value 428. Also, while the above examples involve performing decomposition using raw signals from one or more sensors, other examples can involve performing the decomposition using preprocessed signals.

In some examples, any of the signals, sub-signals, inputs, and outputs previously described in FIG. 4 can be in a digital format and/or the processes performed by empirical mode decomposition blocks 304, 328, 404 may not be implemented. In such examples, digital signals can be used as inputs to the machine-learning models 202, 204, 412 and node 222 to produce the projected surface ROP value 324, the projected downhole ROP value 348, the projected ROP value 426, and the projected ROP value 428 in digital formats. In some examples, a combination of digital signals and analog signals can be used as inputs to the machine-learning models 202, 204, 412 and node 222.

Figure 5:
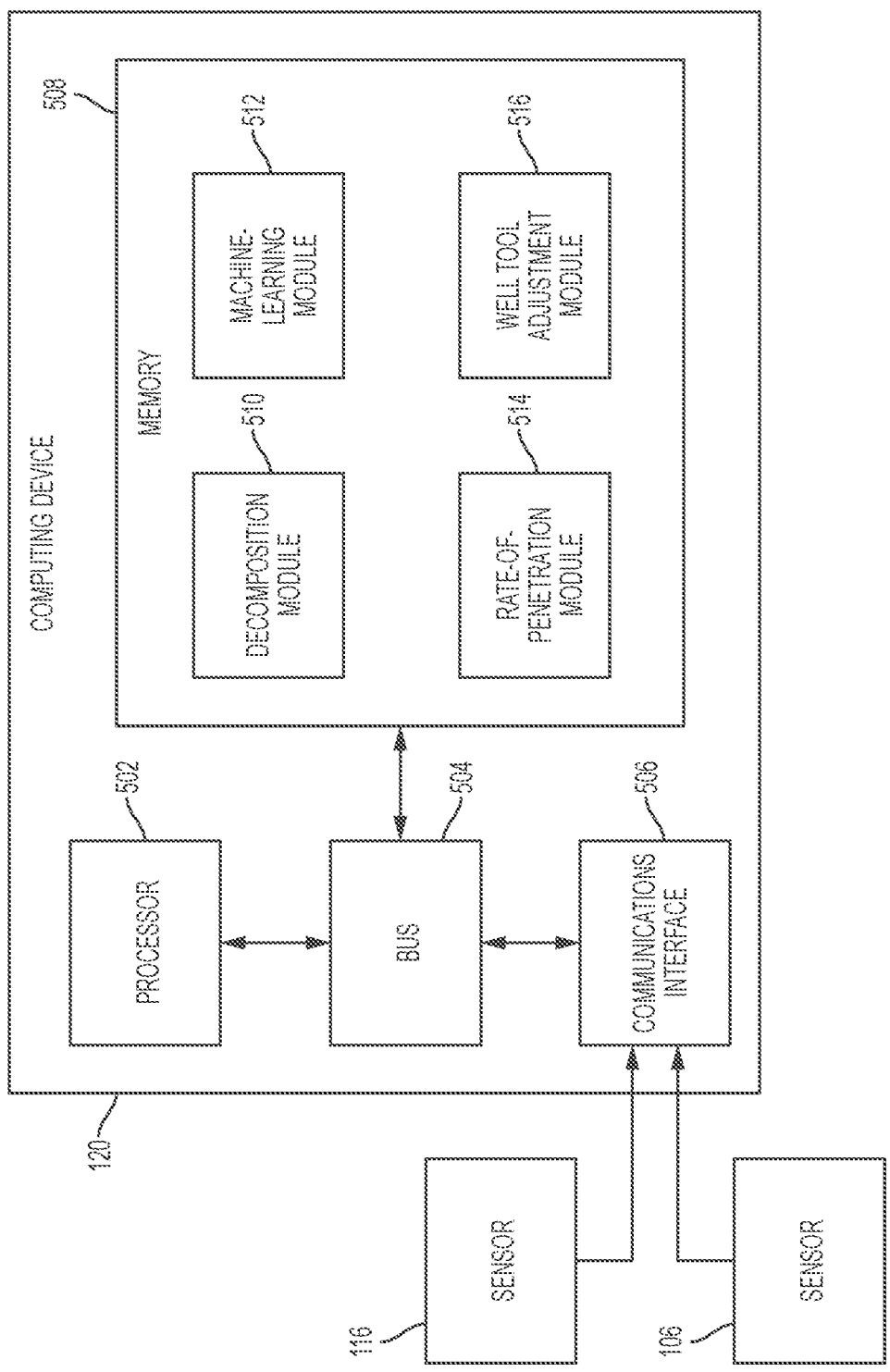
FIG. 5 is a block diagram of an example of a computing device usable for adjusting well tool operation to manipulate a ROP of a drill bit based on multiple ROP projections according to some aspects of the present disclosure.

FIG. 5 is a block diagram of a computing device usable for adjusting well tool operation to manipulate a ROP of a drill bit based on multiple ROP projections according to one example. The computing device 120 can include a processor 502, a bus 504, a communications interface 506, and a memory 508. In some examples, the components shown in FIG. 5 (e.g., the processor 502, the bus 504, the communications interface 506, the memory 508) can be integrated into a single structure. For example, the components can be within a single housing. In other examples, the components shown in FIG. 5 can be distributed (e.g., in separate housings) and in electrical communication with each other.

The processor 502 can execute one or more operations for implementing some examples. The processor 502 can execute instructions stored in the memory 508 to perform the operations. The processor 502 can include one processing device or multiple processing devices. Non-limiting examples of the processor 502 include a Field-Programmable Gate Array ("FPGA"), an application-specific integrated circuit ("ASIC"), a microprocessor, etc.

The processor 502 can be communicatively coupled to the memory 508 via the bus 504. The non-volatile memory 508 may include any type of memory device that retains stored information when powered off. Non-limiting examples of the memory 508 include electrically erasable and programmable read-only memory ("EEPROM"), flash memory, or any other type of non-volatile memory. In some examples, at least some of the memory 508 can include a medium from which the processor 502 can read instructions. A computer-readable medium can include electronic, optical, magnetic, or other storage devices capable of providing the processor 502 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The computing device 120 can be communicatively coupled to the sensors 106, 116 via the communications interface 506. The communications interface 506 can be configured to receive surface sensor information and downhole sensor information relating to the ROP of the drill bit.

The communications interface 506 can be configured to transmit the information received from the sensors 106, 116 to the memory 508 for storage and use as described in the examples.

The memory 508 can include program code for a decomposition module 510, a machine-learning module 512, a ROP module 514, and a well tool adjustment module 516. The decomposition module 510 can decompose raw signals (or preprocessed signals) from the sensors 106, 116 into various contributive sub-signals, as described in some examples. The machine-learning module 512 can build, teach, and use machine-learning models, as described in some examples. The ROP module 514 can determine the ROP of a drill bit in real time using the most recent sensor data. The ROP module 514 can compare the ROP of the drill bit with a projected ROP value determined by the machine-learning module 512 to determine whether an adjustment to a well tool setting or wellbore characteristics should be made. In response to determining that an adjustment is to be made, the well tool adjustment module 516 can cause the adjustment, as described in some examples. The ROP module 514 can also receive a desired ROP value to determine, via the machine-learning module 512 (e.g., which may include an ROP model), well tool adjustments that can effectuate the desired ROP in real time.

Figure 6:
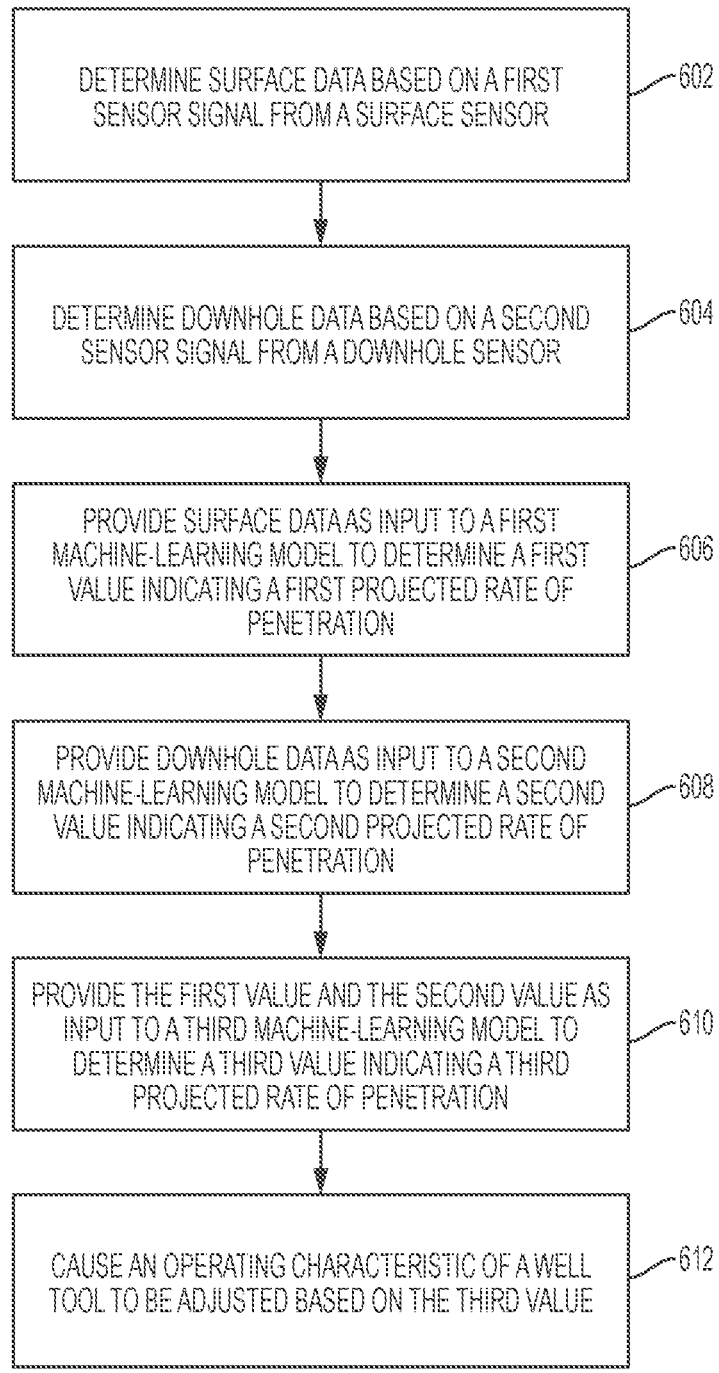
FIG. 6 is a flowchart of an example of a process for adjusting well tool operation to manipulate a ROP of a drill bit based on multiple ROP projections according to some aspects of the present disclosure.

FIG. 6 is a flowchart of a process for adjusting well tool operation to manipulate a ROP of a drill bit based on multiple projected ROP values according to one example. Other examples can include more steps, fewer steps, different steps, or a different order of the steps described with respect to FIG. 6. The steps of FIG. 6 are described with reference to components discussed in FIG. 5.

At block 602, a computing device 120 determines surface data based on a first sensor signal from a surface sensor 116. The surface sensor 116 can transmit a first sensor signal (e.g., a raw signal), where the first sensor signal can correspond to data useable in determining a projected ROP value. The surface sensor 116 can be positioned at a surface of a wellbore that is drilled through a subterranean formation. The first sensor signal detected by the surface sensor 116 can be decomposed into surface data.

At block 604, the computing device 120 determines downhole data based on a second sensor signal from a downhole sensor 106. The downhole sensor 106 can transmit a second sensor signal (e.g., a raw signal), where the second sensor signal can correspond to data useable in determining a projected ROP value. The downhole sensor 106 can be positioned at within the wellbore that is drilled through the subterranean formation. The second sensor signal detected the downhole sensor 106 can be decomposed into downhole data.

At block 606, the computing device 120 provides the surface data as input to a first machine-learning model. The first machine-learning model can be configured to determine a first value indicating a first projected ROP of a drill bit through the subterranean formation based on the surface data.

At block 608, the computing device 120 provides the downhole data as input to a second machine-learning model. The second machine-learning model can be configured to determine a second value indicating a second projected ROP of a drill bit through the subterranean formation based on the downhole data. The second value can be determined in parallel with the first value.

At block 610, the computing device 120 provides the first value and the second value as input to a third machine-learning model. The third machine-learning model can be configured to determine a third value indicating a third projected ROP of the drill bit through the subterranean formation based on the first value and the second value. The third projected ROP can be more accurate than the first projected ROP and the second projected ROP.

At block 612, the computing device 120 causes an operating characteristic of a well tool to be adjusted based on the third value (e.g., to control the ROP of the drill bit). For example, the computing device 120 can cause a well tool setting, wellbore characteristic, or both to be adjusted in order to manipulate the ROP of the drill bit. The computing device 120 can cause these adjustments to be made by transmitting commands to one or more well tools or using other techniques.

As discussed above, the computing device 120 can cause these adjustments to be made based on the third value from the third machine-learning model. For example, the third value from the third machine-learning model may indicate that the ROP of the drill bit is suboptimal (or will be suboptimal in the future), so the computing device can responsively cause one or more well tool settings or wellbore characteristics to be adjusted to improve the ROP of the drill bit.

Some aspects of the present disclosure can be implemented according to one or more of the following examples. As used below, any reference to a series of examples is to be understood as a reference to each of those examples disjunctively (e.g., "Examples 1-4" is to be understood as any of "Examples 1, 2, 3, or 4").

Example 1 is a system comprising: a processing device; and a non-transitory computer-readable medium including program code that is executable by the processing device for causing the processing device to: determine surface data based on a first sensor signal from a surface sensor, wherein the surface sensor is positionable at a surface of a wellbore drilled through a subterranean formation; determine downhole data based on a second sensor signal from a downhole sensor positionable within the wellbore: provide the surface data as input to a first machine-learning model, wherein the first machine-learning model is configured to determine a first value indicating a first projected rate of penetration (ROP) of a drill bit through the subterranean formation based on the surface data; provide the downhole data as input to a second machine-learning model, wherein the second machine-learning model is configured to determine a second value indicating a second projected ROP of the drill bit through the subterranean formation based on the downhole data; provide the first value and the second value as input to a third machine-learning model, wherein the third machine-learning model is configured to determine a third value indicating a third projected ROP of the drill bit through the subterranean formation based on the first value and the second value; and cause an operating characteristic of a well tool to be adjusted based on the third value.

Example 2 is the system of example 1, wherein the non-transitory computer-readable medium further comprises program code that is executable by the processing device for causing the processing device to: teach the first machine-learning model using a first dataset obtained the surface sensor; and teach the second machine-learning model using a second dataset obtained from the downhole sensor.

Example 3 is the system of any of examples 1-2, wherein the non-transitory computer-readable medium further comprises program code that is executable by the processing device for causing the processing device to: generate a ROP model by: iteratively supplying a plurality of surface data to the first machine-learning model and a plurality of downhole data to the second machine-learning model to obtain a plurality of outputs indicating projected ROP values of the drill bit through the subterranean formation; creating multiple relationships between the plurality of surface data, the plurality of downhole data, and a plurality of outputs, wherein the multiple relationships define the ROP model; receive an input indicating a desired ROP value; determine, using the ROP model, one or more setting values for one or more well tools configured to result in the desired ROP value: and adjust the one or more well tools to have the one or more setting values to cause the subterranean formation to be penetrated at the desired ROP value.

Example 4 is the system of any of examples 1-4, wherein the third machine-learning model is configured to determine the third value by selecting either the first value or the second value as the third value.

Example 5 is the system of any of examples 1-5, wherein the first machine-learning model, the second machine-learning model, and the third machine-learning model collectively form a single machine-learning model, and wherein the first machine-learning model and the second machine-learning model are configured to automatically provide the first value and the second value as inputs to the third machine-learning model.

Example 6 is the system of any of examples 1-6, wherein the non-transitory computer-readable medium further comprises program code that is executable by the processing device for causing the processing device to: receive the first sensor signal from the surface sensor: decompose the first sensor signal into a first plurality of signals: generate the surface data based on the first plurality of signals: receive the second sensor signal from the downhole sensor, wherein the downhole sensor is coupled to a drill string: decompose the second sensor signal into a second plurality of signals; and generate the downhole data based on the second plurality of signals.

Example 7 is the system of example 6, wherein the first plurality of signals represent a first revolutions per minute value of the drill string, a first weight-on-bit value, and a first mud weight, and wherein the second plurality of signals represent a second revolutions per minute value of the drill string, a second weight-on-bit value, and a second mud weight.

Example 8 is the system of any of examples 1-7, wherein adjusting the operating characteristic of the well tool comprises causing a revolutions-per-minute value of the drill bit, a weight-on-bit value, or a mud weight value to be changed.

Example 9 is a non-transitory computer-readable medium including program code that is executable by a processing device for causing the processing device to: determine surface data based on a first sensor signal from a surface sensor, wherein the surface sensor is positionable at a surface of a wellbore drilled through a subterranean formation: determine downhole data based on a second sensor signal from a downhole sensor positionable within the wellbore; provide the surface data as input to a first machine-learning model, wherein the first machine-learning model is configured to determine a first value indicating a first projected rate of penetration (ROP) of a drill bit through the subterranean formation based on the surface data; provide the downhole data as input to a second machine-learning model, wherein the second machine-learning model is configured to determine a second value indicating a second projected ROP of the drill bit through the subterranean formation based on the downhole data; provide the first value and the second value as input to a third machine-learning model, wherein the third machine-learning model is configured to determine a third value indicating a third projected ROP of the drill bit through the subterranean formation based on the first value and the second value; and cause an operating characteristic of a well tool to be adjusted based on the third value.

Example 10 is the non-transitory computer-readable medium of example 9, wherein the non-transitory computer-readable medium further comprises program code that is executable by the processing device for causing the processing device to: teach the first machine-learning model using a first dataset obtained from the surface sensor: and teach the second machine-learning model using a second dataset obtained from the downhole sensor.

Example 11 is the non-transitory computer-readable medium of any of examples 9-10, wherein the non-transitory computer-readable medium further comprises program code that is executable by the processing device for causing the processing device to: generate a ROP model by: iteratively supplying a plurality of surface data to the first machine-learning model and a plurality of downhole data to the second machine-learning model to obtain a plurality of outputs indicating projected ROP values of the drill bit through the subterranean formation; creating multiple relationships between the plurality of surface data, the plurality of downhole data, and a plurality of outputs, wherein the multiple relationships define the ROP model; receive an input indicating a desired ROP value; determine, using the ROP model, one or more setting values for one or more well tools configured to result in the desired ROP value; and adjust the one or more well tools to have the one or more setting values to cause the subterranean formation to be penetrated at the desired ROP value.

Example 12 is the non-transitory computer-readable medium of any of examples 9-11, wherein the non-transitory computer-readable medium further comprises program code that is executable by the processing device for causing the processing device to: receive the first sensor signal from the surface sensor; decompose the first sensor signal into a first plurality of signals: generate the surface data based on the first plurality of signals; receive the second sensor signal from the downhole sensor, wherein the downhole sensor is coupled to a drill string; decompose the second sensor signal into a second plurality of signals; and generate the downhole data based on the second plurality of signals.

Example 13 is the non-transitory computer-readable medium of example 12, wherein the first plurality of signals represent a first revolutions per minute value of the drill string, a first weight-on-bit value, and a first mud weight, wherein the second plurality of signals represent a second revolutions per minute value of the drill string, a second weight-on-bit value, and a second mud weight.

Example 14 is the non-transitory computer-readable medium of any of examples 9-13, wherein adjusting the operating characteristic of the well tool comprises causing a revolutions-per-minute value of the drill bit, a weight-on-bit value, or a mud weight value to be changed.

Example 15 is a computer-implemented method comprising: determining surface data based on a first sensor signal from a surface sensor, wherein the surface sensor is positioned at a surface of a wellbore drilled through a subterranean formation: determining downhole data based on a second sensor signal from a downhole sensor positioned within the wellbore; providing the surface data as input to a first machine-learning model, wherein the first machine-learning model is configured to determine a first value indicating a first projected rate of penetration (ROP) of a drill bit through the subterranean formation based on the surface data; providing the downhole data as input to a second machine-learning model, wherein the second machine-learning model is configured to determine a second value indicating a second projected ROP of the drill bit through the subterranean formation based on the downhole data; providing the first value and the second value as input to a third machine-learning model, wherein the third machine-learning model is configured to determine a third value indicating a third projected ROP of the drill bit through the subterranean formation based on the first value and the second value; and causing an operating characteristic of a well tool to be adjusted based on the third value.

Example 16 is the computer-implemented method of example 15, further comprising: teaching the first machine-learning model using a first dataset obtained from the surface sensor: and teaching the second machine-learning model using a second dataset obtained from the downhole sensor.

Example 17 is the computer-implemented method of any of examples 15-16, further comprising: generating a ROP model by: iteratively supplying a plurality of surface data to the first machine-learning model and a plurality of downhole data to the second machine-learning model to obtain a plurality of outputs indicating projected ROP values of the drill bit through the subterranean formation; creating multiple relationships between the plurality of surface data, the plurality of downhole data, and a plurality of outputs, wherein the multiple relationships define the ROP model, receiving an input indicating a desired ROP value; determining, using the ROP model, one or more setting values for one or more well tools configured to result in the desired ROP value, and adjusting the one or more well tools to have the one or more setting values to cause the subterranean formation to be penetrated at the desired ROP value.

Example 18 is the computer-implemented method of any of examples 15-17, further comprising: receiving the first sensor signal from the surface sensor; decomposing the first sensor signal into a first plurality of signals; generating the surface data based on the first plurality of signals; receiving the second sensor signal from the downhole sensor, wherein the downhole sensor is coupled to a drill string: decomposing the second sensor signal into a second plurality of signals: and generating the downhole data based on the second plurality of signals.

Example 19 is the computer-implemented method of example 18, wherein the first plurality of signals represent a first revolutions per minute value of the drill string, a first weight-on-bit value, and a first mud weight, and wherein the second plurality of signals represent a second revolutions per minute value of the drill string, a second weight-on-bit value, and a second mud weight.

Example 20 is the computer-implemented method of any of examples 15-19, wherein adjusting the operating characteristic of the well tool comprises causing a revolutions-per-minute value of the drill bit, a weight-on-bit value, or a mud weight value to be changed.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A system comprising:
a processing device; and
a non-transitory computer-readable medium including program code that is executable by the processing device for causing the processing device to:
determine surface data based on a first sensor signal from a surface sensor, wherein the surface sensor is positionable at a surface of a wellbore drilled through a subterranean formation;
determine downhole data based on a second sensor signal from a downhole sensor positionable within the wellbore;
provide the surface data as input to a first machine-learning model, wherein the first machine-learning model is configured to determine a first value indicating a first projected rate of penetration (ROP) of a drill bit through the subterranean formation based on the surface data;
provide the downhole data as input to a second machine-learning model, wherein the second machine-learning model is configured to determine a second value indicating a second projected ROP of the drill bit through the subterranean formation based on the downhole data;
provide the first value and the second value as input to a third machine-learning model, wherein the third machine-learning model is configured to determine a third value indicating a third projected ROP of the drill bit through the subterranean formation based on the first value and the second value; and
cause an operating characteristic of a well tool to be adjusted based on the third value.

2. The system of claim 1, wherein the non-transitory computer-readable medium further comprises program code that is executable by the processing device for causing the processing device to:
teach the first machine-learning model using a first dataset obtained the surface sensor; and
teach the second machine-learning model using a second dataset obtained from the downhole sensor.

3. The system of claim 1, wherein the non-transitory computer-readable medium further comprises program code that is executable by the processing device for causing the processing device to:
generate a ROP model by:
iteratively supplying a plurality of surface data to the first machine-learning model and a plurality of downhole data to the second machine-learning model to obtain a plurality of outputs indicating projected ROP values of the drill bit through the subterranean formation;
creating multiple relationships between the plurality of surface data, the plurality of downhole data, and the plurality of outputs, wherein the multiple relationships define the ROP model;
receive an input indicating a desired ROP value;
determine, using the ROP model, one or more setting values for one or more well tools configured to result in the desired ROP value; and
adjust the one or more well tools to have the one or more setting values to cause the subterranean formation to be penetrated at the desired ROP value.

4. The system of claim 1, wherein the third machine-learning model is configured to determine the third value by selecting either the first value or the second value as the third value.

5. The system of claim 1, wherein the first machine-learning model, the second machine-learning model, and the third machine-learning model collectively form a single machine-learning model, and wherein the first machine-learning model and the second machine-learning model are configured to automatically provide the first value and the second value as inputs to the third machine-learning model.

6. The system of claim 1, wherein the non-transitory computer-readable medium further comprises program code that is executable by the processing device for causing the processing device to:
receive the first sensor signal from the surface sensor;
decompose the first sensor signal into a first plurality of signals;
generate the surface data based on the first plurality of signals;
receive the second sensor signal from the downhole sensor, wherein the downhole sensor is coupled to a drill string;
decompose the second sensor signal into a second plurality of signals; and
generate the downhole data based on the second plurality of signals.

7. The system of claim 6, wherein the first plurality of signals represent a first revolutions per minute value of the drill string, a first weight-on-bit value, and a first mud weight, and wherein the second plurality of signals represent a second revolutions per minute value of the drill string, a second weight-on-bit value, and a second mud weight.

8. The system of claim 1, wherein adjusting the operating characteristic of the well tool comprises causing a revolutions-per-minute value of the drill bit, a weight-on-bit value, or a mud weight value to be changed.

9. A non-transitory computer-readable medium including program code that is executable by a processing device for causing the processing device to:
determine surface data based on a first sensor signal from a surface sensor, wherein the surface sensor is positionable at a surface of a wellbore drilled through a subterranean formation;
determine downhole data based on a second sensor signal from a downhole sensor positionable within the wellbore;
provide the surface data as input to a first machine-learning model, wherein the first machine-learning model is configured to determine a first value indicating a first projected rate of penetration (ROP) of a drill bit through the subterranean formation based on the surface data;
provide the downhole data as input to a second machine-learning model, wherein the second machine-learning model is configured to determine a second value indicating a second projected ROP of the drill bit through the subterranean formation based on the downhole data;
provide the first value and the second value as input to a third machine-learning model, wherein the third machine-learning model is configured to determine a third value indicating a third projected ROP of the drill bit through the subterranean formation based on the first value and the second value; and
cause an operating characteristic of a well tool to be adjusted based on the third value.

10. The non-transitory computer-readable medium of claim 9, wherein the non-transitory computer-readable medium further comprises program code that is executable by the processing device for causing the processing device to:
teach the first machine-learning model using a first dataset obtained from the surface sensor; and
teach the second machine-learning model using a second dataset obtained from the downhole sensor.

11. The non-transitory computer-readable medium of claim 9, wherein the non-transitory computer-readable medium further comprises program code that is executable by the processing device for causing the processing device to:
generate a ROP model by:
iteratively supplying a plurality of surface data to the first machine-learning model and a plurality of downhole data to the second machine-learning model to obtain a plurality of outputs indicating projected ROP values of the drill bit through the subterranean formation;
creating multiple relationships between the plurality of surface data, the plurality of downhole data, and the plurality of outputs, wherein the multiple relationships define the ROP model;
receive an input indicating a desired ROP value;
determine, using the ROP model, one or more setting values for one or more well tools configured to result in the desired ROP value; and
adjust the one or more well tools to have the one or more setting values to cause the subterranean formation to be penetrated at the desired ROP value.

12. The non-transitory computer-readable medium of claim 9, wherein the non-transitory computer-readable medium further comprises program code that is executable by the processing device for causing the processing device to:
receive the first sensor signal from the surface sensor;
decompose the first sensor signal into a first plurality of signals;
generate the surface data based on the first plurality of signals;
receive the second sensor signal from the downhole sensor, wherein the downhole sensor is coupled to a drill string;
decompose the second sensor signal into a second plurality of signals; and
generate the downhole data based on the second plurality of signals.

13. The non-transitory computer-readable medium of claim 12, wherein the first plurality of signals represent a first revolutions per minute value of the drill string, a first weight-on-bit value, and a first mud weight, wherein the second plurality of signals represent a second revolutions per minute value of the drill string, a second weight-on-bit value, and a second mud weight.

14. The non-transitory computer-readable medium of claim 9, wherein adjusting the operating characteristic of the well tool comprises causing a revolutions-per-minute value of the drill bit, a weight-on-bit value, or a mud weight value to be changed.

15. A computer-implemented method comprising:
determining surface data based on a first sensor signal from a surface sensor, wherein the surface sensor is positioned at a surface of a wellbore drilled through a subterranean formation;
determining downhole data based on a second sensor signal from a downhole sensor positioned within the wellbore;
providing the surface data as input to a first machine-learning model, wherein the first machine-learning model is configured to determine a first value indicating a first projected rate of penetration (ROP) of a drill bit through the subterranean formation based on the surface data;
providing the downhole data as input to a second machine-learning model, wherein the second machine-learning model is configured to determine a second value indicating a second projected ROP of the drill bit through the subterranean formation based on the downhole data;
providing the first value and the second value as input to a third machine-learning model, wherein the third machine-learning model is configured to determine a third value indicating a third projected ROP of the drill bit through the subterranean formation based on the first value and the second value; and
causing an operating characteristic of a well tool to be adjusted based on the third value.

16. The computer-implemented method of claim 15, further comprising:
teaching the first machine-learning model using a first dataset obtained from the surface sensor; and
teaching the second machine-learning model using a second dataset obtained from the downhole sensor.

17. The computer-implemented method of claim 15, further comprising:
generating a ROP model by:
iteratively supplying a plurality of surface data to the first machine-learning model and a plurality of downhole data to the second machine-learning model to obtain a plurality of outputs indicating projected ROP values of the drill bit through the subterranean formation;
creating multiple relationships between the plurality of surface data, the plurality of downhole data, and the plurality of outputs, wherein the multiple relationships define the ROP model;
receiving an input indicating a desired ROP value;
determining, using the ROP model, one or more setting values for one or more well tools configured to result in the desired ROP value; and
adjusting the one or more well tools to have the one or more setting values to cause the subterranean formation to be penetrated at the desired ROP value.

18. The computer-implemented method of claim 15, further comprising:
receiving the first sensor signal from the surface sensor;
decomposing the first sensor signal into a first plurality of signals;
generating the surface data based on the first plurality of signals;
receiving the second sensor signal from the downhole sensor, wherein the downhole sensor is coupled to a drill string;
decomposing the second sensor signal into a second plurality of signals; and
generating the downhole data based on the second plurality of signals.

19. The computer-implemented method of claim 18, wherein the first plurality of signals represent a first revolutions per minute value of the drill string, a first weight-on-bit value, and a first mud weight, and wherein the second plurality of signals represent a second revolutions per minute value of the drill string, a second weight-on-bit value, and a second mud weight.

20. The computer-implemented method of claim 15, wherein adjusting the operating characteristic of the well tool comprises causing a revolutions-per-minute value of the drill bit, a weight-on-bit value, or a mud weight value to be changed.

* * * * *